United States Patent
Babik et al.

(10) Patent No.: US 12,221,531 B2
(45) Date of Patent: Feb. 11, 2025

(54) AMORPHOUS POLYALPHAOLEFIN-CONTAINING POLYOLEFIN BLEND

(71) Applicant: Evonik Operations GmbH, Essen (DE)

(72) Inventors: Sebastian Babik, Düsseldorf (DE); Steffen Cepa, Marl (DE); Sebastian Heßner, Essen (DE); Stefan Kirschbaum, Monheim am Rhein (DE)

(73) Assignee: Evonik Operations GmbH, Essen (DE)

( * ) Notice: Subject to any disclaimer, the term of this patent is extended or adjusted under 35 U.S.C. 154(b) by 532 days.

(21) Appl. No.: 17/763,160

(22) PCT Filed: Oct. 13, 2020

(86) PCT No.: PCT/EP2020/078736
§ 371 (c)(1),
(2) Date: Mar. 23, 2022

(87) PCT Pub. No.: WO2021/074125
PCT Pub. Date: Apr. 22, 2021

(65) Prior Publication Data
US 2023/0002601 A1    Jan. 5, 2023

(30) Foreign Application Priority Data

Oct. 16, 2019 (EP) .................... 19203594

(51) Int. Cl.
*C08L 23/12* (2006.01)
*C08L 23/06* (2006.01)
*C08L 23/20* (2006.01)

(52) U.S. Cl.
CPC .............. *C08L 23/12* (2013.01); *C08L 23/20* (2013.01); *C08L 2203/10* (2013.01); *C08L 2203/16* (2013.01); *C08L 2205/03* (2013.01); *C08L 2207/02* (2013.01); *C08L 2207/20* (2013.01)

(58) Field of Classification Search
CPC .. C08L 2207/20; C08L 2205/03; C08L 23/06; C08L 23/12; C08L 23/142; C08L 23/18; C08L 23/20
See application file for complete search history.

(56) References Cited

U.S. PATENT DOCUMENTS

| | | | |
|---|---|---|---|
| 4,390,666 A | 6/1983 | Moriguchi et al. | |
| 4,737,547 A | 4/1988 | White | |
| 7,014,886 B2 | 3/2006 | Vey et al. | |
| 8,399,571 B2 | 3/2013 | Becker et al. | |
| 8,530,582 B2 | 9/2013 | Becker et al. | |
| 9,550,344 B2 | 1/2017 | Becker et al. | |
| 2008/0194765 A1 | 8/2008 | Becker et al. | |
| 2013/0118128 A1 | 5/2013 | Luecke et al. | |
| 2016/0102230 A1 | 4/2016 | Gray et al. | |
| 2018/0134884 A1 | 5/2018 | Glenister et al. | |
| 2019/0218383 A1 | 7/2019 | Li et al. | |
| 2021/0324239 A1 | 10/2021 | Luecke et al. | |
| 2022/0177679 A1* | 6/2022 | Kahlen | C08L 23/12 |

FOREIGN PATENT DOCUMENTS

| | | | | |
|---|---|---|---|---|
| CA | 2102542 A1 | 5/1994 | | |
| CN | 1861652 A | 11/2006 | | |
| EP | 0 884 353 A1 | 12/1998 | | |
| EP | 1418205 A1 | 5/2004 | | |
| EP | 1947142 A1 * | 7/2008 | ............. | B32B 27/32 |
| JP | H849170 A | 2/1996 | | |
| JP | 201120299 A | 2/2011 | | |
| WO | 2011/119486 A1 | 9/2011 | | |
| WO | 2021/228563 A1 | 11/2021 | | |

OTHER PUBLICATIONS

English International Search Report mailed on Feb. 24, 2021 in PCT/EP2020/078736 (3 pages).
Filho et al., "Study of Propylene-1-butene-ethylene Terpolymer and Reactor Blend by TREF and 13C-NMR," Journal of Applied Polymer Science, Copyright 2001, vol. 80, pp. 1880-1890 (11 pages).
German International Search Report mailed on Feb. 24, 2021 in PCT/EP2020/078736 (5 pages).
German Written Opinion mailed on Feb. 24, 2021 in PCT/EP2020/078736 (5 pages).
Zambelli et al., Communications to the Editor, Macromolecules, Copyright Oct. 1975, vol. 8, No. 5, pp. 687-689 (3 pages).

* cited by examiner

*Primary Examiner* — Marc S Zimmer
(74) *Attorney, Agent, or Firm* — Michael Best & Friedrich LLP

(57) ABSTRACT

The present invention relates to a blend containing at least two different polyolefins which is characterized in that it contains as a further constituent an amorphous poly-alpha-olefin which is based on the monomers ethene, propene and 1-butene and has a viscosity at 190° C. of 200 mPa*s to 200,000 mPa*s, wherein it contains polyethylene and polypropylene as at least two different polyolefins and wherein the polyethylene has a melt flow index [MFI 2.16 kg@190° C.] determined according to the method ISO 1133 reported in the description of less than 10 g/10 min, preferably of 0.01 to 2 g/10 min, and the polypropylene has a melt flow index [MFI 2.16 kg@230° C.] determined according to the method reported in the description of less than 50 g/10 min, preferably of 0.01 to 25 g/10 min, to a process for producing such blends and to the use thereof.

19 Claims, 1 Drawing Sheet

AMORPHOUS POLYALPHAOLEFIN-CONTAINING POLYOLEFIN BLEND

CROSS REFERENCE TO RELATED APPLICATIONS

This application is a 35 U.S.C. § 371 U.S. national phase entry of International Application No. PCT/EP2020/078736 having an international filing date of Oct. 13, 2020, which claims the benefit of European Application No. 19203594.7 filed Oct. 16, 2019, each of which is incorporated herein by reference in its entirety.

FIELD

The present invention relates to a blend containing at least two different polyolefins which is characterized in that it contains as a further constituent an amorphous poly-alpha-olefin which is based on the monomers ethene, propene and 1-butene and has a viscosity at 190° C. measured according to the method reported in the description of 200 mPa*s to 200,000 mPa*s, wherein it contains polyethylene and polypropylene as at least two different polyolefins and wherein the polyethylene has a melt flow index [MFI 2.16 kg@190° C.] determined according to the method ISO 1133 reported in the description of less than 10 g/10 min, preferably of 0.01 to 2 g/10 min, and the polypropylene has a melt flow index [MFI 2.16 kg@230° C.] determined according to the method reported in the description of less than 50 g/10 min, preferably of 0.01 to 25 g/10 min, to a process for producing such blends and to the use thereof.

BACKGROUND

Polyolefins, especially the homo- and copolymers from the class of polyethylenes, polypropylenes and polybutenes, form the largest class of the commonly used plastics and register the largest production volumes globally. Substantial fields of application of these materials are films, packagings and a very wide variety of injection moulded parts, for example for automotive manufacture. Especially in automotive manufacture it is important to produce these injection moulded parts with a well-modulated balance of strength and impact resistance in order to ensure the best possible everyday usability.

In order to ensure this balance it is common practice to employ mixtures comprising a component intended to ensure strength, usually a crystalline polypropylene, and a further component intended to ensure impact resistance, often a polyethylene-rich component. The latter component is often rubberlike and also tacky and the proportion of this component in the production process therefore cannot be increased as desired since the mixture would otherwise no longer be processable due to parts of the plant becoming gummed up.

In order to increase the quality of heterophasic polymer mixtures, in particular those comprising polyethylene and polypropylene, additives are often used to compatibilize the polypropylene matrix having a crystalline structure which is responsible for strength with the soft, impact-absorbing polyethylene-rich fraction.

EP 0884353 A1 describes a synergistic combined composition comprising a random ethylene/propylene copolymer and a random ethylene/α-olefin copolymer having a low to very low density, wherein the α-olefin contains at least 4 carbon atoms. It further relates to polyolefin compositions, in particular polypropylene compositions, comprising the combined composition. The random ethylene/α-olefin copolymer has an MFI of 0.1 to 30 dg/min.

US 2018134884 A1 describes the use of $C_3$-$C_2$-block copolymers and styrene-ethylene-butylene-styrene (SEBS) rubber components having an MFI of not more than 30 dg/min.

US 2019218383 A1 describes polymer compositions comprising from 1% to 30% by weight of a copolymer obtainable by reaction of ethylene with an α-olefin having 3 to 10 carbon atoms. The copolymer has an MFI of 100 to 2000 dg/min and a molecular weight distribution (MWD) between 1 and 5.

WO 2011/119486 A1 describes the production of an "impact-modified" mixture based on polyolefins (PP or HDPE) using an ethylene-α-olefin copolymer having an MWD of well below 5.

CA 2102542 A1 describes a gas phase process for producing a $C_2$-$C_3$ copolymer having a maximum MFI of 500 and mentions the fact that the material is obtained in a "non-sticky" form downstream of the gas phase reactors. It is further described that a high rubber content in the process is a problem.

In recent times there has been a further need to be able to process polypropylene- and/or polyethylene-containing recyclates into mixtures which after processing have material characteristics similar to those obtainable using virgin polyethylene and/or polypropylene.

The problem addressed by the present invention was therefore that of providing blends of polyolefins which solve one or more of the abovementioned problems.

SUMMARY

It was found, surprisingly, that blends containing at least two different polyolefins which contain as a further constituent an amorphous poly-alpha-olefin which is based on the monomers ethene, propene and 1-butene and has a viscosity at 190° C. of 200 mPa*s to 200,000 mPa*s can solve one or more of the recited problems.

DETAILED DESCRIPTION

Figure 1:
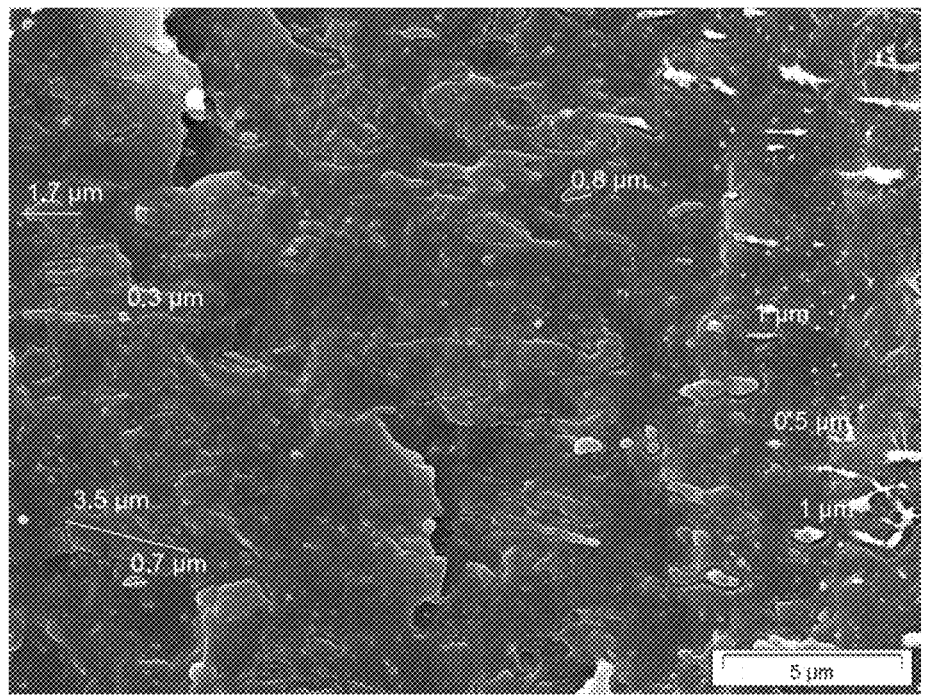
FIG. 1 shows a scanning electron micrograph of the fracture edge of the test specimen according to example 1.11, prepared and recorded as described in example 2.

The present invention therefore provides blends containing at least two different polyolefins which are characterized in that they contain as a further constituent an amorphous poly-alpha-olefin (APAO) which is based on the monomers ethene, propene and 1-butene and has a viscosity at 190° C. determined according to the method reported hereinbelow in the methods of measurement section of 200 mPa*s to 200,000 mPa*s, wherein it contains polyethylene and polypropylene as at least two different polyolefins and wherein the polyethylene has a melt flow index [MFI 2.16 kg@190° C.] determined according to the method ISO 1133 reported in the description of less than 10 g/10 min, preferably of 0.01 to 2 g/10 min, and the polypropylene has a melt flow index [MFI 2.16 kg@230° C.] determined according to the method reported in the description of less than 50 g/10 min, preferably of 0.01 to 25 g/10 min.

The present invention further provides a process for producing a blend according to the invention and the use thereof as defined in the claims and more particularly described hereinbelow. The blends according to the invention have the advantage that they exhibit improved material characteristics. The blends according to the invention in particular exhibit good/improved impact resistance and good/improved expansion behavior at a moderate loss of tensile strength. A further advantage of the blends according to the invention is that they exhibit a good phase compatibility of polyethylene and polypropylene when polyethylene and polypropylene are present as different polyolefins.

Due to the use of the APAO the blends according to the invention may also contain larger amounts of recyclate, in particular polyethylene and/or propylene recyclate, without the material characteristics deteriorating to the extent that the material is no longer usable for the intended purpose.

The separation of polymer waste is currently often not yet operable in a single variety manner so that for example PE recyclates still contain small amounts of PP polymers and PP recyclates still contain small amounts of PE polymers. Especially for blends containing such non-single-variety recyclates the use according to the invention of the APAO is particularly advantageous.

The blends according to the invention, the process according to the invention and the use according to the invention of the blends are described by way of example hereinafter, without any intention that the invention be restricted to these illustrative embodiments. Where ranges, general formulae or compound classes are specified below, these are intended to comprise not only the corresponding ranges or groups of compounds which are explicitly mentioned but also all subranges and subgroups of compounds which can be obtained by removing individual values (ranges) or compounds. Where documents are cited in the context of the present description, their content shall fully form part of the disclosure content of the present invention, particularly in respect of the matters referred to. Where figures are reported hereinbelow in percent, these figures are percentages by weight unless otherwise stated. Where averages, for example molar mass averages, are reported hereinbelow, these are the numerical average unless stated otherwise. Where material characteristics, such as for example viscosities or the like, are reported hereinbelow, these are material characteristics at 25° C. unless otherwise stated. Where chemical (empirical) formulae are used in the present invention, the reported indices may be either absolute numbers or average values. For polymeric compounds, the indices preferably represent average values.

The blends according to the invention containing at least two different polyolefins are characterized in that they contain as a further constituent an amorphous poly-alpha-olefin which is based on the monomers ethene, propene and 1-butene and has a viscosity at 190° C. determined according to the method reported hereinbelow in the methods of measurement section of 200 mPa*s to 200,000 mPa*s, preferably of 1000 to 150,000 mPa*s, more preferably of 2000 bis 100,000 mPa*s and particularly preferably 3000 to 50,000 mPa*s, wherein it contains polyethylene and polypropylene as at least two different polyolefins and wherein the polyethylene has a melt flow index [MFI 2.16 kg@190° C.] determined according to the method ISO 1133 reported in the description of less than 10 g/10 min, preferably of 0.01 to 2 g/10 min, and the polypropylene has a melt flow index [MFI 2.16 kg@230° C.] determined according to the method reported in the description of less than 50 g/10 min, preferably of 0.01 to 25 g/10 min.

As the at least two different polyolefins the blend according to the invention preferably contains polyethylene and polypropylene. The proportion of minority polyolefin in the blend is preferably from 1% to 45% by weight, more preferably 2% to 30% by weight and particularly preferably 5% to 20% by weight and the proportion of the majority polyolefin in the blend is preferably from 55% to 99% by weight, more preferably 70% to 98% by weight and particularly preferably from 80% to 95% by weight based on the total mass of the at least two different polyolefins present in the blend. The abovementioned proportions are preferred especially when the at least two different polyolefins are partially or completely recyclates.

It may be advantageous when at least one of the two different polyolefins is at least partially, preferably to an extent of more than 50% by weight and more preferably completely a recyclate. It is preferable when, of the at least two different polyolefins, both polyolefins are at least partially, preferably to an extent of more than 50% by weight and more preferably completely recyclates.

The proportion of amorphous poly-alpha-olefin in the blend according to the invention is preferably from 1% to 25% by weight, more preferably 2% to 15% by weight, particularly preferably 3% to 10% by weight and very particularly preferably 5% to 7.5% by weight based on the total mass of the blend.

The amorphous poly-alpha-olefin preferably has a polydispersity (Mw/Mn) of 5 to 10 and/or, preferably and, a glass transition temperature of −45° C. to −25° C., in each case determined according to the method of measurement reported hereinbelow in the methods of measurement section.

The amorphous poly-alpha-olefin preferably has a melt flow index [MFI 2.16 kg@140° C.] of 40 to 10,000, preferably of 50 to 5000 and more preferably of 100 to 2000 determined according to the method of measurement reported hereinbelow in the methods of measurement section.

In the amorphous poly-alpha-olefin based on the monomers ethylene, propylene and 1-butene, the proportion of the monomers propylene or 1-butene is more than 50% by weight, preferably 51% to 98% by weight, and the proportion of the sum of the remaining monomers ethylene and 1-butene or ethylene and propene is in each case less than 50% by weight, in each case based on the sum of the proportions of ethylene, propylene and 1-butene. The proportion of ethylene is preferably from 1% to 15% by weight based on the sum of the monomers ethylene, propylene and 1-butene.

It can be advantageous when the amorphous poly-alpha-olefin has isotacticities of the 1-butene or propene blocks of less than 80% of the mmmm-pentad determined according to the method of measurement reported in the description.

The blend is preferably a mixture of the recited constituents, more preferably a pellet mixture of pellets of the recited constituents. It can be advantageous when the blend is in the form of a mixed pellet material in which each pellet contains all constituents. Such mixed pellet materials have the advantage that the processing thereof, for example by injection moulding, affords components in which the constituents are more homogeneously distributed which can result in better material characteristics.

The blend according to the invention may contain further constituents such as for example additives, fillers and/or pigments (organic or inorganic). The blends according to the invention preferably comprise fibers, more preferably glass fibers, mineral fibers, wood fibers or other fiber components, as fillers. This makes it possible to increase the strength of the blends according to the invention. This allows the blends to be employed or used in applications which place high mechanical demands on the employed material, such as for example when used as, or for production of, compounds or composites. The blend preferably comprises from 0.01% to 3% by weight of at least one antioxidant, based on the sum of APAO and antioxidants. Employable antioxidants include all substances known as antioxidants and/or inhibitors, i.e. substances that stop the propagation of a free-radical reaction. The blend according to the invention preferably contains sterically hindered amines, for example piperidine derivatives, more preferably sterically hindered phenols, such as for example Irganox 1010, Naugard XL1, Songnox 1035. This makes it possible to prevent or reduce degradation of the APAO and/or yellowing of the APAO.

The blend may preferably comprise from 0.01% to 3% by weight of at least one degradation product of a free-radical former, based on the sum of APAO and degradation products of free-radical formers. The blend according to the invention preferably comprises benzoic acid, methanol, butanol, tert-butanol, propionic acid and/or, preferably or, 2,5-dimethylhexanol as a degradation product of a free-radical former.

The blends according to the invention may be produced by known processes for producing blends. The blends according to the invention are preferably produced by the process for producing blends described hereinbelow which is characterized in that the constituents of the blend are commixed.

In the process according to the invention the constituents are preferably employed and mixed as powders or pellets. It may be advantageous when a pellet mixture thus obtained is processed into a mixed pellet material, for example by extruding the pellet mixture. The pellet mixture may thus be applied for example via a mixing drum or using hoppers the pellets may be charged via a mixing funnel and thus homogeneously sent to a further pelletizing process in a mixing extruder before this additized pellet material is then subjected to the further processing operations. It is alternatively also possible via a sequence of extruders to meter the components as a melt stream into an extruder which then opens into a moulding process. Furthermore one of these processes may also be used to fabricate the final workpiece directly via an extrusion or injection moulding process without proceeding via the granulate.

It may be advantageous when the process according to the invention contains a step which comprises the production of packagings, films, injection moulded parts, pipes, hoses, fibers, textiles, bottles, plastic housings, masterbatch compounds for improved pigment dispersion, manufacturing plastics in the automotive or transport sectors.

The blends according to the invention/the blend produced according to the invention may be employed for all applications for which polyolefin blends are typically employed. It is preferable when the blends according to the invention/ the blends produced according to the invention are employed or used as, or for production of, packagings, films, injection moulded parts, pipes, hoses, fibers, textiles, bottles, plastic housings, masterbatch compounds for improved pigment dispersion, manufacturing plastics in the automotive or transport sectors.

Even without further elaboration it is assumed that a person skilled in the art is able to utilize the description above to the greatest possible extent. The preferred embodiments and examples are therefore to be interpreted merely as a descriptive disclosure which is by no means limiting in any way whatsoever.

Figure 2:
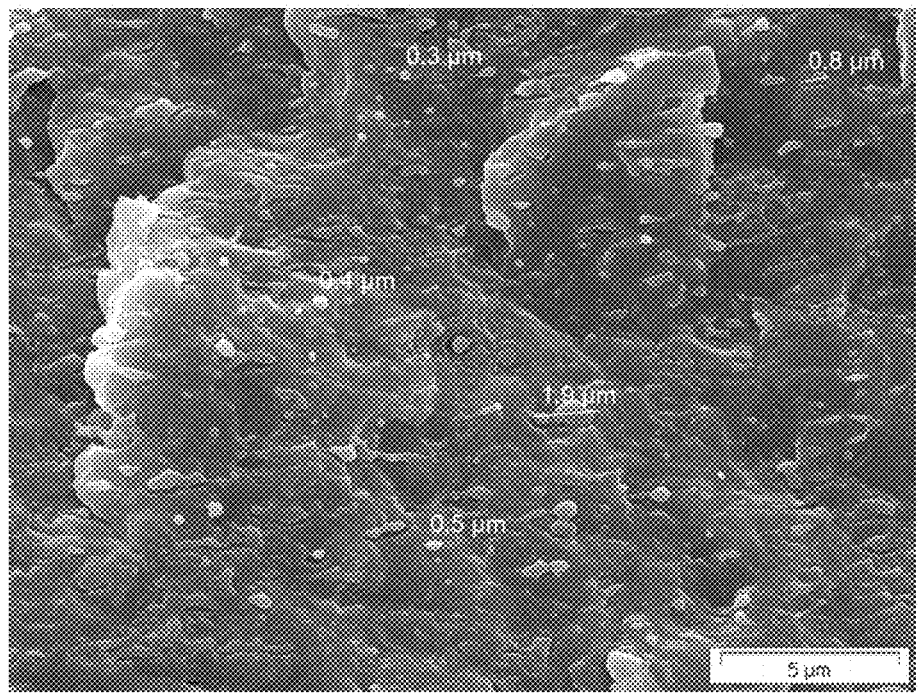
FIG. 2 shows a scanning electron micrograph of the fracture edge of the test specimen according to example 1.12, prepared and recorded as described in example 2.

The subject-matter of the present invention is more particularly elucidated by figures FIG. 1 and FIG. 2 without any intention that the subject-matter of the present invention be restricted thereto.

FIG. 1 shows a scanning electron micrograph of the fracture edge of the test specimen according to example 1.11, prepared and recorded as described in example 2.

FIG. 2 shows a scanning electron micrograph of the fracture edge of the test specimen according to example 1.12, prepared and recorded as described in example 2.

The subject-matter of the present invention is more particularly elucidated in the examples which follow, without any intention that the subject-matter of the present invention be restricted to these.

Methods of Measurement:

Notched impact resistance: The notched impact resistance was determined according to IZOD ISO 180/1A using a Zwick 5102.100/00 test apparatus.

Tensile test: The tensile tests were produced and performed according to EN ISO 527-1. A Zwick BT1-FB010TH.D30 test apparatus was employed.

Optical determination of domains: The analytical instruments employed were an Epson V850 Pro scanner and a JEOL SM IT300 scanning electron microscope (SEM).

Glass transition temperature [$T_g$]: The thermal analyses were performed according to DIN EN ISO 11357. A Mettler Toledo DSC1 instrument was employed and the evaluation was carried out by means of Stare 10.0 software. For semicrystalline polymer samples the influence of thermal history is removed only upon melting of the entire sample; the determination of $T_g$ therefore requires a second heating run to obtain reproducible results at the defined heating and cooling rate. A uniform heating rate of 10 K/min to Tg+50° C. and cooling rate of 20 K/min to Tg−50° C. should preferably be employed. The glass transition temperature is the sample temperature at which half of the change in specific heat capacity [0.5 $\Delta c_P$] is achieved. It is the temperature of the intersection of the middle line between the extrapolated baselines before and after the glass transition with the measured curve.

Molecular weight determination: Mw stands for weight-average molecular weight and Mn stands for number-average molecular weight. The molecular weights Mw and Mn are determined by HT-GPC [high-temperature gel permeation chromatography] as described in DIN 55 672. Specifically, analytical HT-GPC is performed at 150° C. using a PL220 oven (Agilent, Waldbronn) with integrated isocratic pump. 1,2,4-trichlorobenzene (TCB) (Merck, Darmstadt) spiked with ~ 1 g/L butylhydroxytoluene (BHT) was used as the mobile phase with a flow rate of 1 mL/min and one Agilent PLgel Olexis Guard (50×7.5 mm, precolumn) and three Agilent PLgel Olexis (300×7.5 mm) columns were used as the stationary phase. Detection was performed by means of an IR detector (model IR4, PolymerChar, Valencia, Spain). The datasets were evaluated using a polystyrene calibration (EasiCal PS-1, Agilent) using WinGPC software (Polymer Standards Service, Mainz). The polydispersity (Mw/Mn), also known as molecular weight distribution, is obtained by dividing the weight-average molecular weight by the number-average molecular weight.

Viscosity at 190° C.: The viscosity is determined at 190° C. by measurements with a rotary viscometer as per DIN 53 019. Measurements are performed using a Brookfield CAP 2000+ cone-plate viscometer with a viscosity-dependent shear rate as per the following Table a:

TABLE a

| Cone | Shear rate | Eta (at 10% torque utilization) | Eta (at 100% torque utilization) |
|---|---|---|---|
| 07 | 10 s-1 | 6300 mPas | 63000 mPas |
| 08 | 10 s-1 | 25000 mPas | 250,000 mPas |
| 07 | 30 s-1 | 2100 mPas | 21000 mPas |

Calibration of the Brookfield viscometer was carried out using a 500,000 BW Newtonian standard sample. This was obtained from Zentrum für Messen und Kalibrieren & Analytik GmbH and issued with an accompanying calibration certificate. Instrument calibration is performed only upon changing the DKD oil using DKD oil from ZMK& ANALYTIK GmbH. This is performed using cone 7. An initial measurement of the new DKD oil is initially taken. This is followed by calibration of the instrument. The Newtonian standard sample is weighed in directly onto the spindle. This comprises placing it upside down in a 100 ml Erlenmeyer flask and weighing in the appropriate amount. The spindle is subsequently mounted in the viscometer and lowered. After maintaining preheating for at least 3 min, 'Spindle' is depressed in the control panel and confirmed with 'Enter'. The prompt 'Calibrate YES/NO' appears. Selecting 'YES' initiates calibration mode. The desired temperature and the dynamic viscosity (see current calibration certificate) of the fluid are subsequently inputted and confirmed. It should be noted here that the viscosity figure must be entered in cP (cP=mPas). In response to the prompt 'SPEED' 10 s-1 is inputted and confirmed with 'Enter'. The calibration is then initiated with 'Run'. After calibration, the calibration value is stored with 'Enter'.

Melt flow index (MFI): The MFI 2.16 kg@230° C. and 2.16 kg@190° C. was determined according to ISO 1133-1:2011 using a Zwick MFlow instrument. The melt mass flow rate (MFR) and the melt volume flow rate (MVR) are determined by extruding a molten material from the cylinder of a plastometer through an extrusion die of specified length and specified diameter under specified conditions of temperature and applied load. If at a temperature of 190° C. the MFI values are above 1000 at a load of 2.16 kg, the measurement temperature must be reduced to 140° C. to obtain reliable measured values (MFI 2.16@140° C.).

To measure the MFR (method A), extruded sections from specified times are weighed and used to calculate the extrusion rate in g/10 min.

To measure the MVR (method B), the path length covered by the piston in a specified time, or the time required for the piston to cover a specified path length, is plotted and used to calculate the extrusion rate in $cm^3$/10 min.

The MVR may be converted into the MFR, or vice versa, if the density of the melt of the material at the test temperature is known.

Isotacticity:

The polymer composition and isotacticity [% of mmmm-pentad] are determined by high temperature $^{13}$C-NMR as described in the following publications:

A. Zambelli et al: Macromolecules, 8, 687 (1975) and A. Filho, G. Galland: J. Appl. Polym. Sci., 80, 1880 (2001).

EXAMPLES

Employed Substances:

| | | |
|---|---|---|
| Polypropylene | RB307MO | Borealis AG |
| Polypropylene | HF955MO | Borealis AG |
| Polypropylene recyclate | procyclen ® PP 10 MIO C09 | ALBA Recycling GmbH |
| Polyethylene recyclate | recythen ® HDPE | ALBA Recycling GmbH |
| Polyethylene | BorPure ™ MB 5 5 68 | Borealis AG |
| Polyethylene | BB2581 | Borealis AG |
| APAO | VESTOPLAST ® 888 | Evonik Resource Efficiency GmbH |
| APAO | VESTOPLAST ® 704 | Evonik Resource Efficiency GmbH |
| Block copolymer | INFUSE ™ 9807 | The Dow Chemical Company |
| Polypropylene | L-MODU ™ S600 | Idemitsu Kosan Co., Ltd. |
| Low-crystalline PE/PP copolymer | LICOCENE ® PP2602 | Clariant AG |

TABLE b

Parameters of various input materials

| Additive | Mw/Mn | MFI 2.16@190° C. [g/10 min] | MFI 2.16kg@140° C. [g/10 min] | Tg [° C.] | Viscosity@190° C. [mPas] |
|---|---|---|---|---|---|
| VESTOPLAST ® 888 | 6.8 | 129 | n.m. | −23 | ~90,000 |
| VESTOPLAST ® 704 | 5.9 | >1000 | 930 | −28 | ~4000 |
| INFUSE ™ 9807 | 2.1 | 15 | n.m. | −62 | >1,000,000 |
| L-MODU ™ S600 | 1.9 | 173 | 44 | −10 | ~40,000 |
| LICOCENE ® PP2602 | 1.8 | >1000 | 1300 | −9 | ~2500 |

TABLE c

Parameters of various input materials (manufacturer's data)

| Polymer | MFI 2.16@ 190° C. [g/10 min] | MFI 2.16kg@ 230° C. [g/10 min] |
|---|---|---|
| RB307MO | — | 1.5 |
| HF955MO | — | 20.0 |
| BorPure ™ MB5568 | 0.8 | — |
| BB2581 | 0.3 | — |
| procyclen ® PP 10M10C09 | — | 10.0 |
| recythen ® HOPE | | |

Example 1

Pellet mixtures were produced using the raw materials and amounts reported in Table 1. Mixing was carried out manually by addition of all ingredients into a PE bag whose contents were subsequently supplied to the funnel of a gravimetric metering system. The pellet mixture was subsequently processed into a mixed pellet material in an extruder (Leistritz ZSE 27 MAXXX 44LD) at 210° C. and a speed of 300 rpm.

TABLE 1

Employed raw materials and amounts (in percent by weight) for producing the pellet mixtures

| Example | PP | PE | APAO |
|---|---|---|---|
| 1.1 | 65% HF955MO | 35% BB2581 | — |
| 1.2 | 61% HF955MO | 33% BB2581 | 6% VESTOPLAST ® 888 |
| 1.3 | 61% HF955MO | 33% BB2581 | 6% VESTOPLAST ® 704 |
| 1.4 | 61% HF955MO | 33% BB2581 | 6% L-MODU ™ S600 |
| 1.5 | 61% HF955MO | 33% BB2581 | 6% LICOCENE ® PP2602 |
| 1.6 | 61% HF955MO | 33% BB2581 | 6% INFUSE ™ 9807 |
| 1.7 | 65% HF955MO | 35% BorPure ™MB5568 | — |
| 1.8 | 61% HF955MO | 31% BorPure ™MB5568 | 6% VESTOPLAST ® 888 |
| 1.9 | 65% RB307MO | 35% BB2581 | — |
| 1.10 | 61% RB307MO | 33% BB2581 | 6% VESTOPLAST ® 888 |
| 1.11 | 65% RB307MO | 35% BorPure ™MB5568 | — |
| 1.12 | 61% RB307MO | 33% BorPure ™MB5568 | 6% VESTOPLAST ® 888 |
| 1.13 | 67% RB307MO | 33% BorPure ™MB5568 | |
| 1.14 | 63% RB307MO | 31% BorPure ™MB5568 | 6% VESTOPLAST ® 888 |

This mixed pellet material was subsequently used to produce tensile test specimens (tensile test dumbbells) according to DIN EN ISO 527-2 in an injection moulding machine (Engel ES200/50HL) at an injection temperature of 230° C., an injection pressure of 600 bar and a cycle time of 45 sec.

Half of the tensile test dumbbells were used to determine the notched impact resistance (NIR) according to IZOD ISO 180/1A and the other half were used for tensile testing according to EN ISO 527-1. The results of the tests can be found in Table 2. Therein: $E_T$=tensile modulus, $\sigma_M$=tensile strength, $\sigma_Y$=yield stress, $\varepsilon_Y$=yield elongation, $\varepsilon_{tB}$=nominal breaking elongation and $\varepsilon_B$=breaking elongation.

TABLE 2

Results of the tests

| | | Tensile testing according to EN ISO 527-1 | | | | | |
|---|---|---|---|---|---|---|---|
| Example | NIR [kJ/m²] | $E_T$ [MPa] | $\sigma_M$ [MPa] | $\sigma_Y$ [MPa] | $\varepsilon_Y$ [%] | $\varepsilon_{tB}$ [%] | $\varepsilon_B$ [%] |
| 1.1 | 2.63 | 926 | 35.6 | | 7.2 | 8.8 | 7.2 |
| 1.2 | 1.51 | 848 | 29.6 | | | | 5.3 |
| 1.3 | 1.54 | 825 | 29.2 | | | | 4.5 |
| 1.4 | 1.87 | 876 | 32.8 | | | | 6.5 |
| 1.5 | n.m. | n.m. | n.m. | n.m. | n.m. | n.m. | n.m. |
| 1.6 | 6.06 | 840 | 30.6 | 30.6 | 6.8 | 9 | 6.7 |
| 1.7 | 3.60 | 889 | 36.3 | 36.3 | 7.4 | 11 | |
| 1.8 | 2.34 | 774 | 30.5 | | | | 6.2 |
| 1.9 | 13.03 | 602 | 25.9 | 25.9 | 12.0 | 160 | |
| 1.10 | 14.46 | 525 | 23.3 | 23.2 | 13.0 | 280 | |
| 1.11 | 13.62 | 585 | 25.4 | 25.4 | 12.0 | 150 | |
| 1.12 | 24.37 | 505 | 22.7 | 22.8 | 13.0 | 270 | |
| 1.13 | 13.60 | | 25.0 | | | 100 | |
| 1.14 | 24.90 | | 22.1 | | | 186 | | n.m.: not measured

As is apparent from Tables 1 and 2, addition of APAOs as additives to PE/PP pellet mixtures makes it possible to obtain mixed pellet materials from which moulded articles may be injection moulded having markedly better (higher) elongation behavior and a better (higher) impact resistance at only slightly impaired tensile strengths. This applies especially to those blends containing at least one further amorphous or at least semicrystalline polyolefin component in addition to the APAO.

Example 2

Test specimens from examples 1.11 and 1.12 were cooled in liquid nitrogen and in each case fractured longitudinally and transversely, sputtered with palladium and subsequently analyzed by SEM. Micrographs are shown in the figures FIG. 1 and FIG. 2.

In the specimens of examples 1.11 and 1.12 the images show a greater number of smaller domains which appear more homogeneous in FIG. 2. It therefore appears that bonding is improved as is also indicated by the better mechanical properties of example 1.12 (Table 2).

The invention claimed is:
1. A blend containing at least two different polyolefins, wherein the blend contains as a further constituent an amorphous poly-alpha-olefin which is based on the monomers ethene, propene and 1-butene and has a viscosity at 190° C. measured according to the method reported in the description of from 200 mPa*s to 200,000 mPa*s, wherein the blend contains polyethylene and polypropylene as at least two different polyolefins and wherein the polyethylene has a melt flow index [MFI 2.16 kg@190° C.] determined according to the method ISO 1133 reported in the description of less than 10 g/10 min, and the polypropylene has a melt flow index [MFI 2.16 kg@230° C.] determined according to the method reported in the description of less than 50 g/10 min.

2. The blend according to claim 1, wherein at least one of the two different polyolefins is at least partially, a recyclate.

3. The blend according to claim 1, wherein the proportion of amorphous poly-alpha-olefin is from 1% to 25% by weight based on the total mass of the blend.

4. The blend according to claim 1, wherein the proportion of minority polyolefin in the blend is from 1% to 45% by weight, and the proportion of the majority polyolefin in the blend is from 55% to 99% by weight based on the total mass of the at lease two different polyolefins.

5. The blend according to claim 1, wherein the amorphous poly-alpha-olefin has a polydispersity of 5 to 10 and/or, a glass transition temperature of from −45° C. to −25° C., in each case determined according to the method of measurement reported in the description.

6. The blend according to claim 1, wherein the amorphous poly-alpha-olefin has a melt flow index [MFI 2.16 kg@140° C.] of from 40 g/10 min to 10,000 g/10 min determined according to the method of measurement reported in the description.

7. The blend according to claim 1, wherein the amorphous poly-alpha-olefin is based on the monomers ethylene, propylene and 1-butene, wherein the proportion of the monomers propylene or 1-butene is more than 50% by weight and the proportion of the sum of the remaining monomers ethylene and 1-butene or ethylene and propene is in each case less than 50% by weight, in each case based on the sum of the molar proportions of ethylene, propylene and 1-butene.

8. The blend according to claim 1, wherein amorphous poly-alpha-olefin has isotacticities of the 1-butene or propene blocks of less than 80% of the mmmm-pentad determined according to the method of measurement reported in the description.

9. A process for producing blends according to claim 1, wherein the constituents are commixed.

10. The process according to claim 9, wherein the constituents are provided and mixed as powder or pellets.

11. The process according to claim 10, wherein the pellet mixture is extruded to afford a mixed pellet material.

12. The process according to claim 9, wherein the process contains a step which comprises the production of packagings, films, injection moulded parts, pipes, hoses, fibers, textiles, bottles, plastic housings, masterbatch compounds for improved pigment dispersion, manufacturing plastics in the automotive or transport sectors.

13. A product comprising the blend according to claim 1, wherein the product is selected from the group consisting of packagings, films, injection moulded parts, pipes, hoses, fibers, textiles, bottles, plastic housings, masterbatch compounds for improved pigment dispersion, manufacturing plastics in the automotive or transport sectors.

14. The blend according to claim 1, wherein the polyethylene has a melt flow index [MFI 2.16 kg@190° C.] determined according to the method ISO 1133 of from 0.01 to 2 g/10 min, and the polypropylene has a melt flow index [MFI 2.16 kg@230° C.] of from 0.01 to 25 g/10 min.

15. The blend according to claim 1, wherein the proportion of amorphous poly-alpha-olefin is from 2% to 15% by weight based on the total mass of the blend.

16. The blend according to claim 1, wherein the proportion of amorphous poly-alpha-olefin is from 5% to 7.5% by weight based on the total mass of the blend.

17. The blend according to claim 1, wherein the proportion of minority polyolefin in the blend is from 2% to 30% by weight and the proportion of the majority polyolefin in the blend is from 70% to 98% by weight based on the total mass of the at least two different polyolefins.

18. The blend according to claim 1, wherein the proportion of minority polyolefin in the blend is from 5% to 20% by weight and the proportion of the majority polyolefin in the blend is from 80% to 95% by weight based on the total mass of the at least two different polyolefins.

19. The blend according to claim 3, wherein the polyethylene has a melt flow index [MFI 2.16 kg@190° C.] determined according to the method ISO 1133 of from 0.01 to 2 g/10 min, and the polypropylene has a melt flow index [MFI 2.16 kg@230° C.] of from 0.01 to 25 g/10 min.

* * * * *